(12) United States Patent
Moix Olive

(10) Patent No.: US 11,423,752 B2
(45) Date of Patent: Aug. 23, 2022

(54) FIRE DETECTION IN AN OCCUPIED COMPARTMENT

(71) Applicant: Carrier Corporation, Palm Beach Gardens, FL (US)

(72) Inventor: Pere Moix Olive, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/496,887

(22) Filed: Oct. 8, 2021

(65) Prior Publication Data

US 2022/0172590 A1 Jun. 2, 2022

(30) Foreign Application Priority Data

Nov. 30, 2020 (EP) ..................................... 20383038

(51) Int. Cl.
  *G08B 17/00* (2006.01)
  *G08B 17/10* (2006.01)
  *B60R 16/023* (2006.01)
  *G08B 25/00* (2006.01)
  *G08B 21/22* (2006.01)

(52) U.S. Cl.
  CPC .......... *G08B 17/10* (2013.01); *B60R 16/0237* (2013.01); *G08B 21/22* (2013.01); *G08B 25/008* (2013.01)

(58) Field of Classification Search
  CPC ...... G08B 17/10; G08B 21/22; G08B 25/008; B60R 16/0237
  See application file for complete search history.

(56) References Cited

U.S. PATENT DOCUMENTS 5,339,072 A * 8/1994 Agata .................. G08B 29/046
  340/693.9
8,451,132 B1 * 5/2013 Van Vleet .............. G08B 21/14
  340/630

(Continued)

FOREIGN PATENT DOCUMENTS

JP   2004152162 A * 5/2004
KR   20120100578 A   9/2012

(Continued)

OTHER PUBLICATIONS

European Search Report for application EP 20383038.5, dated May 11, 2021, 17 pages.

*Primary Examiner* — Ojiako K Nwugo
(74) *Attorney, Agent, or Firm* — Cantor Colburn LLP

(57) ABSTRACT

A fire detection system includes a heat detector configured to monitor a fire detection volume; a smoke detector configured to monitor the fire detection volume; and an occupancy sensor configured to detect the presence of at least one person within the fire detection volume. The fire detection system is configured to monitor for the presence of a fire within the fire detection volume using the heat detector and the smoke detector responsive to determining, using the occupancy sensor, that the fire detection volume is unoccupied. The fire detection system is configured to monitor for the presence of a fire within the fire detection volume using the heat detector and not using the smoke detector responsive to determining, using the occupancy sensor, that the fire detection volume is occupied.

15 Claims, 1 Drawing Sheet

(56) References Cited

U.S. PATENT DOCUMENTS

| | | | |
|---|---|---|---|
| 8,988,232 B1 * | 3/2015 | Sloo | H04L 12/2809 |
| | | | 340/602 |
| 9,679,255 B1 * | 6/2017 | Mullaly | G08B 29/188 |
| 2008/0291036 A1 | 11/2008 | Richmond | |
| 2010/0238036 A1 | 9/2010 | Holcombe | |
| 2016/0189513 A1 | 6/2016 | Sloo | |
| 2019/0208095 A1 * | 7/2019 | Kraz | F21V 5/046 |
| 2019/0263339 A1 * | 8/2019 | Lee | H02J 50/20 |
| 2019/0301689 A1 * | 10/2019 | Hetrick | F21S 2/005 |
| 2019/0385373 A1 * | 12/2019 | Mittleman | G06T 15/30 |

FOREIGN PATENT DOCUMENTS

| | | | | |
|---|---|---|---|---|
| KR | 102263305 B1 * | 3/2014 | | |
| WO | WO-2005052879 A1 * | 6/2005 | | G08B 17/00 |

\* cited by examiner

FIRE DETECTION IN AN OCCUPIED COMPARTMENT

FOREIGN PRIORITY

This application claims priority to European Patent Application No. 20383038.5, filed Nov. 30, 2020, and all the benefits accruing therefrom under 35 U.S.C. § 119, the contents of which in its entirety are herein incorporated by reference.

TECHNICAL FIELD

The present disclosure relates to fire detection, and particularly to fire detection in a space which may be occupied by at least one person.

BACKGROUND

Various methods exist for fire detection in transport vehicles, such as trains, coaches and planes, many of which utilise both heat sensing and optical smoke sensing to detect the presence of fire. A heat detector has the purpose of reacting to heat and relaying this information either through a built-in alarm or through an alarm of a fire control panel connected to the heat detector. An optical smoke detector has the purpose of reacting to smoke and relaying this information either through a built-in alarm or through an alarm of a fire control panel connected to the smoke detector.

Toilet compartments in transport vehicles offer passengers privacy, and this privacy can lead to passengers smoking a cigarette or vaping. These actions can trigger false alarms in the fire detection system if performed in the vicinity of the smoke detector.

At least the preferred embodiments of the present disclosure seek to further improve such fire detection systems.

SUMMARY

Viewed from a first aspect, the present invention provides a method of controlling a fire detection system comprising a heat detector and a smoke detector, each being configured to monitor a fire detection volume associated with the fire detection system, the method comprising: determining the presence of at least one person within the fire detection volume; monitoring for the presence of a fire within the fire detection volume using the heat detector and the smoke detector responsive to determining that the fire detection volume is unoccupied; and monitoring for the presence of a fire within the fire detection volume using the heat detector and not using the smoke detector responsive to determining that the fire detection volume is occupied.

The smoke detector may detect a concentration of suspended particulates within the fire detection volume. The heat detector may detect an ambient temperature of the fire detection volume. The smoke detector may be configured to raise an alert signal responsive to determining that a level of particulates within the fire detection volume is above a threshold level. The heat detector may be configured to raise an alert signal responsive to determining that a temperature within the fire detection volume is above a threshold level.

The fire detection system may be configured to deactivate the smoke detector responsive to determining that the fire detection volume is occupied. The fire detection system may be configured to stop supplying power to the smoke detector.

The fire detection system may be configured to ignore an alert signal raised by the smoke detector responsive to determining that the fire detection volume is occupied. The fire detection system may be configured to store an indication when a false alarm has been avoided in response to receiving an alert signal raised by the smoke detector while the fire detection volume is occupied. This indication may be useful to alert a member of staff to possible misuse of the fire detection volume, for example to smoke cigarettes or to vape.

The method may further comprise waiting for a predetermined time period after determining the fire detection volume is unoccupied before resuming detecting the presence of a fire within the fire detection volume using the heat detector and the smoke detector. That is to say, once a person has vacated the fire detection volume, the fire detection system will wait for a period of time before monitoring for the presence of a fire with the smoke detector (as well as the heat detector). Thus, the method may comprise monitoring for the presence of a fire within the fire detection volume using the heat detector and not using the smoke detector for a predetermined period of time responsive to determining that the fire detection volume has changed from occupied to unoccupied. Preferably, the predetermined time period is selected to allow a concentration of particulates within the fire detection volume, generated by smoking or vaping, to fall below a threshold level. The predetermined time period may be based on the size of the fire detection volume and/or the ventilation of the fire detection volume.

The presence of at least one person within the fire detection volume may be detected using an occupancy sensor. Alternatively, the fire control system may be configured to receive data relating to the presence of at least one person within the fire detection volume from an auxiliary system associated with the fire detection volume, such as a lighting control system associated with the fire detection volume or a door lock system associated with the fire detection volume.

The occupancy sensor may be at least one of an infrared light sensor, an ultrasonic sensor and a LiDAR sensor. Further exemplary sensors may include an ambient light sensor, a motion sensor, a microwave sensor and a radar sensor.

The fire detection volume may be located within a compartment of a transport vehicle. The transport vehicle may be a train, an aeroplane, a ship or a coach. The compartment may be a toilet compartment.

The method may comprise triggering an alarm in response to an alert signal raised by the heat detector or the smoke detector. The alarm may comprise activating an audible and/or visual alarm. Such alarms may serve to alert occupants of the need to evacuate. The alarm may comprise sending a notification to an external recipient, such as to a system operator and/or to a fire service provider, or another appropriate emergency service provider. The alarm may also comprise triggering a fire protection system or a fire suppression system, optionally those associated with a specific fire detection volume and/or an adjacent fire detection volume. Exemplary fire protection systems may comprise fire door or fire barrier release systems or other systems designed to inhibit progress of a fire. Exemplary fire suppression systems may include wet or dry sprinkler systems, or gaseous fire suppression systems.

The fire detection system may be contained within a single housing unit located in the fire detection volume, and may comprise an integral alarm and integral processing logic. The alarm may be triggered, i.e. the determination that an alarm should be triggered may be made, by the integral processing logic responsive to alert signals received from the integral heat detector and integral smoke detector. Alternatively, the fire detection system may comprise a fire control panel and an alarm, wherein the determination that the alarm should be triggered may be made by the fire control panel responsive to alert signals from the discrete heat detector and discrete smoke detector. The fire control panel may be located remotely from the fire detection volume, such as in a maintenance area or an operator cab or cabin of a transport vehicle. The fire control panel may be connected to a plurality of fire detectors configured to monitoring a plurality of fire detection volumes.

Viewed from a second aspect, the present invention provides a fire detection system comprising: a heat detector configured to monitor a fire detection volume; a smoke detector configured to monitor the fire detection volume; and an occupancy sensor configured to detect the presence of at least one person within the fire detection volume; wherein the fire detection system is configured to monitor for the presence of a fire within the fire detection volume using the heat detector and the smoke detector responsive to determining, using the occupancy sensor, that the fire detection volume is unoccupied, and wherein the fire detection system is configured to monitor for the presence of a fire within the fire detection volume using the heat detector and not using the smoke detector responsive to determining, using the occupancy sensor, that the fire detection volume is occupied.

The heat detector and the smoke detector may be contained within a single housing unit located in the fire detection volume. Furthermore, the heat detector, the smoke detector and the occupancy sensor may be contained within a single housing unit. Combined sensor units can reduce the number of units that need to be installed in the fire detection volume.

Moreover, the fire detection system may be wholly contained within the single housing unit located in the fire detection volume; the fire detection system comprising an integral alarm and integral processing logic, wherein the integral processing logic is configured to trigger the alarm responsive to alert signals received from the heat detector and the smoke detector.

The fire detection system may comprise a fire control panel and an alarm, and the fire control panel may be configured to trigger the alarm responsive to alert signals received from the heat detector and the smoke detector. The fire control panel may be located remotely from the heat detector and the smoke detector, such as in a maintenance area or an operator cab or cabin of a transport vehicle. The fire control panel may be connected to a plurality of fire detectors configured to monitoring a plurality of fire detection volumes.

The smoke detector may be configured to detect a concentration of suspended particulates within the fire detection volume. The heat detector may be configured to detect an ambient temperature of the fire detection volume. The smoke detector may be configured to raise an alert signal responsive to determining that a level of particulates within the fire detection volume is above a threshold level. The heat detector may be configured to raise an alert signal responsive to determining that a temperature within the fire detection volume is above a threshold level.

The fire detection system may be configured to deactivate the smoke detector responsive to determining that the fire detection volume is occupied. The fire detection system may be configured to stop supplying power to the smoke detector.

The fire detection system may be configured to ignore an alert signal raised by the smoke detector responsive to determining that the fire detection volume is occupied. The fire detection system may be configured to log when a false alarm has been avoided in response to receiving an alert signal raised by the smoke detector while the fire detection volume is occupied.

The fire detection system may be configured to wait for a predetermined time period after determining the fire detection volume is unoccupied before resuming detecting the presence of a fire within the fire detection volume using the heat detector and the smoke detector. That is to say, once a person has vacated the fire detection volume, the fire detection system will wait for a period of time before monitoring for the presence of a fire with the smoke detector again (as well as the heat detector). Thus, the fire detection system may be configured to monitor for the presence of a fire within the fire detection volume using the heat detector and not using the smoke detector for a predetermined period of time responsive to determining that the fire detection volume has changed from occupied to unoccupied. Preferably, the predetermined time period is selected to allow a concentration of particulates within the fire detection volume, generated by smoking or vaping, to fall below a threshold level. The predetermined time period may be based on the size of the fire detection volume and/or the ventilation of the fire detection volume.

The occupancy sensor may be at least one of an infrared light sensor, an ultrasonic sensor and a LiDAR sensor. Further exemplary sensors may include an ambient light sensor, a motion sensor, a microwave sensor and a radar sensor.

The fire detection volume may be located within a compartment of a transport vehicle. The transport vehicle may be a train, an aeroplane, a ship or a coach. The compartment may be a toilet compartment.

The alarm may comprise activating an audible and/or visual alarm. Such alarms serve to alert occupants of the need to evacuate. The alarm may comprise sending a notification to an external recipient, such as to a system operator and/or to a fire service provider or another appropriate emergency service provider. The alarm may also comprise triggering a fire protection system or a fire suppression system, optionally those associated with a specific fire detection volume and/or an adjacent fire detection volume. Exemplary fire protection systems may comprise fire door or fire barrier release systems or other systems designed to inhibit progress of a fire. Exemplary fire suppression systems may include wet or dry sprinkler systems, or gaseous fire suppression systems.

Viewed from a third aspect, the present invention provides a transport vehicle comprising a compartment including a fire detection volume; and a fire detection system as set out above and configured to monitor the fire detection volume. The fire detection system may comprise any one or more or all of the optional features described above.

Optionally, the compartment may comprise a lighting control system configured to activate lighting in the fire detection volume responsive to determining that the fire detection volume is occupied. The lighting control system may comprise an occupancy sensor, which may be configured to detect the presence of at least one person within the fire detection volume.

The lighting control system may be in communication with the fire control system and/or is configured to provide data relating to the presence of at least one person within the fire detection volume to the fire control system. Alternatively, the occupancy sensor of the fire control system may be an ambient light sensor responsive to the lighting in the fire detection volume.

Optionally, the compartment may comprise a door lock system. The door lock system may be in communication with the fire control system and/or is configured to provide data relating to the presence of at least one person within the fire detection volume to the fire control system. In other words, the door lock system may inform the fire control system when a compartment door is locked, and the fire control system may therefore determine that the fire detection volume is occupied.

Viewed from a fourth aspect, the present invention provides a computer program product or a tangible computer-readable medium storing a computer program product, wherein the computer program product comprises computer-readable instructions that when executed will cause a fire detection system to perform a method according to the first aspect.

Optionally, the computer-readable instructions may cause the fire detection system to perform any one or more or all of the optional steps described above.

BRIEF DESCRIPTION OF THE DRAWINGS

Preferred embodiments of the present disclosure will now be described in greater detail, by way of example only and with reference to the accompanying drawings, in which.

DETAILED DESCRIPTION

Figure 1:
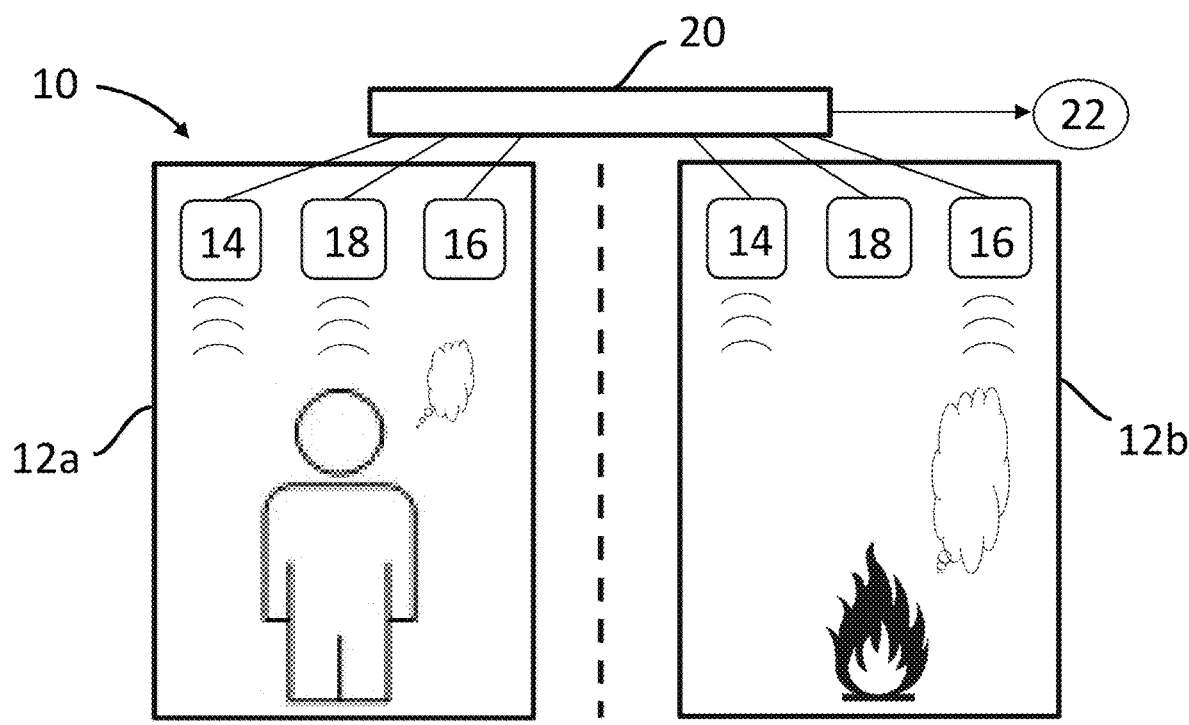
FIG. 1 shows a fire detection system monitoring a fire detection volume when the fire detection volume is occupied and when the fire detection volume is not occupied.

A transport vehicle having a fire detection system 10 typically comprises one or more fire detection volumes 12. These may include substantially isolated volumes of space within the transport vehicle, such as compartments within the transport vehicle, as well as non-delineated volumes of space such as part of a compartment within the transport vehicle. Two compartments are illustrated as first and second fire detection volumes 12a, 12b in FIG. 1.

Within each fire detection volume 12 there is provided at least one heat detector 14 and at least one smoke detector 16. A heat detector 14 is a device capable of detecting an increase of thermal energy within its local vicinity. A heat detector 14 can be broadly classified as either a rate-of-rise heat detector or a fixed temperature heat detector. A smoke detector 16 is a device capable of detecting the presence of smoke within its local vicinity. Many types of smoke detector 16 exist, but are broadly classified as either ionisation smoke detectors or photoelectric smoke detectors. Photoelectric smoke detectors are more commonly used, but both types of smoke detector 16 are compatible with the present disclosure. The manner of operation of such heat detectors 14 and smoke detectors 16 is well known to those in the technical field, and will not be described in detail.

Each of the heat detectors 14 and smoke detectors 16 associated with the fire detection system 10 are in communication with a fire control panel 20 of the fire detection system 10. Typically, this communication is via a wired network installed within the transport vehicle. However, wireless communication may be used in some instances.

The heat detectors 14 each are configured to transmit an alert signal to the fire control panel 20 responsive to determining that a temperature of the respective fire detection volume 12 is above a threshold level. The smoke detectors 16 each are configured to transmit an alert signal to the fire control panel 20 responsive to determining that a level of particulates detected within the respective fire detection volume 12 is above a threshold level. Different thresholds may be used for different detectors 14, 16, and the threshold used for each detector 14, 16 may be selected based on the specific fire detection volume 12 being monitored by that detector 14, 16.

The fire control panel 20 monitors the alert signals received from each of the heat detectors 14 and the smoke detectors 16 and determines whether or not it is necessary to trigger an alarm state. The alarm state may comprise activating an audible and/or visual alarm within the transport vehicle. Such alarms serve to alert the vehicle operator, and occupants of the vehicle, of the need to evacuate. The alarm state may comprise sending an alert to a recipient external to the vehicle, such as to a system operator and/or to a fire service provider or another appropriate emergency service provider. The alarm state may comprise triggering a fire protection system or a fire suppression system within the transport vehicle, optionally those associated with a specific fire detection volume and/or nearby fire detection volumes. Exemplary fire protection systems may comprise fire door or fire barrier release systems or other systems designed to inhibit progress of a fire. Exemplary fire suppression systems may include wet or dry sprinkler systems, or gaseous fire suppression systems.

In accordance with the following embodiments, each fire detection volume 12 is monitored for the presence of a fire via one of two approaches. In a first situation, when the fire detection volume is occupied (e.g. the first fire detection volume 12a), the fire detection volume 12 is monitored by using the heat detector 14 and not using the smoke detector 16. In a second situation, when the fire detection volume is not occupied (e.g. the second fire detection volume 12b), the fire detection volume 12 is monitored by using both the heat detector 14 and using the smoke detector 16.

The presence of people within a fire detection volume 12 can cause increased levels of particulate pollution within the fire detection volume 12. To a small degree, such pollution can include increased levels of dust and particulate matter that is disturbed into the air due to movement of those people. However, people can also introduce specific particulate pollution into the air within the fire detection volume 12. For example, by the use of aerosols, smoking or vaping, etc.

Thus, whilst the fire detection volume 12 is occupied, it is desirable to prevent the fire detection system 10 from monitoring the fire detection volume 12 with the smoke detector 16 to avoid false alarms. This does mean that a real fire might proceed undetected by the fire detection system 10 for longer than it would if the fire detection volume 12 was monitored by both the heat detector 14 and the smoke detector 16. However, when the fire detection volume 12 is occupied, it is expected that the occupants of the fire detection volume 12 would manually trigger the fire detection system 10 in the event of a fire, such as by activating a manual call point or the like.

Whilst the fire detection volume 12 is occupied, the smoke detector 16 may be deactivated. Turning off smoke detectors 16 when not in use may reduce the energy consumption of the fire detection system.

Alternatively, when the fire detection volume 12 is occupied, the fire control panel 20 may be configured to ignore an alert signal received from the smoke detector 16. In this way, the fire control panel 20 can be prevented from triggering a false alarm. Furthermore, the fire control panel 20 may store an indication, and/or notify the vehicle operator, that a level of particulates detected within the (occupied)

fire detection volume 12 is above a threshold level, i.e. that an occupant is possibly smoking.

Additionally, a predetermined time delay may be introduced before reactivating or starting to use the smoke detector 16 to monitor the fire detection volume 12, particularly before resuming use of the smoke detector 16 following the fire detection volume 12 becoming unoccupied. This provides time for any pollution to subside or be extracted before the smoke detectors 16 of the fire detection system 10 are used again, as smoke or the like may remain present within the fire detection volume 12 for some time after the occupant departs.

FIG. 1 illustrates an embodiment of the above technique. In this embodiment, a fire control system 10 is monitoring two fire detection volumes 12a, 12b in a transport vehicle. The fire control panel 20 receives information from a heat detector 14, a smoke detector 16 and an occupancy sensor 18 positioned in each of the two fire detection volumes 12a, 12b. The fire control panel 20 is further in communication with an alarm 22.

The occupancy sensor 18 is configured to detect the presence of at least one person within the fire detection volume 12 and notify the fire control panel 20 when the fire detection volume is occupied. The occupancy sensor 18 may be one of an infrared light sensor, an ultrasonic sensor and a LiDAR sensor.

In accordance with an embodiment of the present invention, as seen in the first fire detection volume 12a of FIG. 1, the fire control panel 20 stops using the corresponding smoke detector 16 to monitor for the presence of a fire within the fire detection volume 12 because the fire detection volume 12a is occupied.

As seen in the second fire detection volume 12b of FIG. 1, the presence of a fire is detectable by both of the heat detector 14 and the smoke detector 16, and the detector(s) will send an alert signal to the fire control panel 20 because the fire detection volume 12b is unoccupied. The fire control panel 20 may be configured to always trigger an alarm 22 when it receives an alert signal from the heat detector 14. However, the fire control panel 20 may be configured to only trigger an alarm 22 when it receives an alert signal from the smoke detector 16 if the fire detection volume 12 is known to be unoccupied.

In a further embodiment, the fire control panel 20 may receive data from a lighting control system of the transport vehicle (not shown). Typically, when a compartment within a vehicle is occupied, the occupant will turn the lights on, and when the occupant leaves they will turn the lights off. Thus, the lighting control system may indicate whether a fire detection volume 12 is occupied.

Furthermore, some lighting control systems may include occupancy sensors for controlling the lighting within the transport vehicle. The data from such occupancy sensors may be provided to the fire control panel 20.

Alternatively, where direct interaction between the lighting control system and the fire detection system 10 is not possible, a similar effect can be achieved by providing ambient light sensors within the fire detection volumes 12. The ambient light sensors measure whether lights within the fire detection volume 12 are switched on or not, which provides an indication of whether the fire detection volume 12 is occupied.

Figure 2:
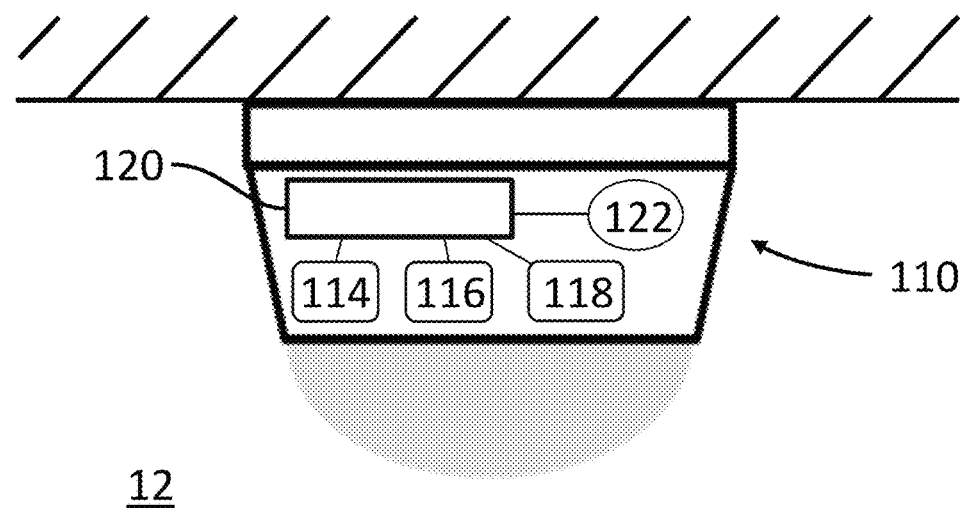
FIG. 2 shows an integral fire detection system.

FIG. 2 illustrates an embodiment of a self-contained fire detection system 110. Each fire detection volume 12 may contain one or more self-contained fire detection systems 110 provided therein. The self-contained fire detection system 110 operates in a similar manner to the fire detection system 10 described above, and like elements are numbered with corresponding reference signs, incremented by 100.

The fire detection system 110 comprises a heat detector 114, a smoke detector 116 and an occupancy sensor 118. The heat detector 114 is capable of detecting an increase in thermal energy within the vicinity of the fire detection system 110. The smoke detector 116 is capable of detecting a level of particulates within the vicinity of the fire detection system 110, and may be either an ionisation smoke sensor or photoelectric smoke sensor. The occupancy sensor 118 is capable of detecting the presence of at least one person within the vicinity of the fire detection system 110.

The heat detector 114, smoke detector 116 and occupancy sensor 118 of the fire detection system 110 are comprised within a single housing unit. The fire detection system 110 comprises an integral alarm 122 and integral processing logic 120.

In the illustrated example, the occupancy sensor 118 comprises a passive infrared (PIR) sensor and an ambient light sensor. The use of two different occupancy sensors 118 provided in the fire detection system 110 can improve the accuracy of the detection of at least one person within the vicinity of the fire detection system 110. It will be appreciated that, in alternative embodiments only a single sensor may be used in the occupancy sensor 18, or that the occupancy sensor 118 may comprise any one or more of the sensors discussed above.

The integral processing logic 120 of the fire detection system 110 may be capable of independently assessing whether triggering an alarm state is required in response to information received from the heat detector 114, smoke detector 116 and occupancy sensor 118. For example, the integral processing logic 120 may be capable of determining that the level of particulates within its fire detection volume 12 exceeds a respective threshold, but that an alarm should not be triggered, as discussed above, based on the occupancy sensor 118 determining that the fire detection volume 12 is occupied.

The alarm state triggered by the integral processing logic 120 may comprise triggering an audible and/or visual alarm 122, which may be integrally provided within the fire detection system 110. That is to say, the fire detection system 110 may be a self-contained unit that is capable of operation independent of a fire control panel 20. Accordingly, the fire detection system 110 may be configured to perform any of the actions as described above in relation to the fire detection system 10.

The fire control panel 20 and internal processing logic 120 each comprise a processor and a memory, wherein the memory stores computer-executable instructions and the processor is configured to execute the computer-executable instructions to perform the methods as detailed herein.

The above described fire detection systems 10, 110 are particularly applicable to transport vehicles, especially where smoking or vaping in compartments of the vehicle may cause false alarms. However, it will be appreciated that the techniques described herein are not limited to such applications and may be employed in fire detection systems used for buildings, such as residential or office buildings, or indeed to fire detection systems employed in other environments such as shipping containers.

What is claimed is:

1. A method of controlling a fire detection system comprising a heat detector and a smoke detector, each being configured to monitor a fire detection volume associated with the fire detection system, the method comprising:

determining the presence of at least one person within the fire detection volume;

monitoring for the presence of a fire within the fire detection volume using the heat detector and the smoke detector responsive to determining that the fire detection volume is unoccupied; and monitoring for the presence of a fire within the fire detection volume using the heat detector and not using the smoke detector responsive to determining that the fire detection volume is occupied.

2. A method according to claim 1, wherein the fire detection system is configured to deactivate the smoke detector responsive to determining that the fire detection volume is occupied.

3. A method according to claim 1, wherein the fire detection system is configured to ignore an alert signal raised by the smoke detector responsive to determining that the fire detection volume is occupied.

4. A method according to claim 1, the method further comprises waiting for a predetermined time period after determining the fire detection volume is unoccupied before resuming detecting the presence of a fire within the fire detection volume using the heat detector and the smoke detector.

5. A method according to claim 1, wherein the presence of at least one person within the fire detection volume is detected using an occupancy sensor; preferably wherein the occupancy sensor is at least one of an infrared light sensor, an ultrasonic sensor and a LiDAR sensor.

6. A method according to claim 1, wherein the fire detection volume is located within a compartment of a transport vehicle.

7. A fire detection system comprising:
a heat detector configured to monitor a fire detection volume;
a smoke detector configured to monitor the fire detection volume; and
an occupancy sensor configured to detect the presence of at least one person within the fire detection volume;
wherein the fire detection system is configured to monitor for the presence of a fire within the fire detection volume using the heat detector and the smoke detector responsive to determining, using the occupancy sensor, that the fire detection volume is unoccupied, and
wherein the fire detection system is configured to monitor for the presence of a fire within the fire detection volume using the heat detector and not using the smoke detector responsive to determining, using the occupancy sensor, that the fire detection volume is occupied.

8. A fire detection system according to claim 7, wherein the heat detector and the smoke detector are contained within a single housing unit located in the fire detection volume.

9. A fire detection system according to claim 8, wherein the fire detection system is wholly contained within the single housing unit located in the fire detection volume; the fire detection system comprising an integral alarm and integral processing logic, wherein the integral processing logic is configured to trigger the alarm responsive to alert signals received from the heat detector and the smoke detector.

10. A fire detection system according to claim 7, wherein the fire detection system comprises a fire control panel and an alarm, and wherein the fire control panel is configured to trigger the alarm responsive to alert signals received from the heat detector and the smoke detector.

11. A fire detection system according to claim 7, wherein the fire detection system is configured to deactivate the smoke detector responsive to determining the fire detection volume is occupied.

12. A fire detection system according to claim 7, wherein the fire detection system is configured to ignore an alert signal raised by the smoke detector responsive to determining the fire detection volume is occupied.

13. A fire detection system according to claim 7, wherein the fire detection system is configured to wait for a predetermined time period after determining the fire detection volume is unoccupied before resuming detecting the presence of a fire within the fire detection volume using the heat detector and the smoke detector.

14. A fire detection system according to claim 7, wherein the occupancy sensor is at least one of an infrared light sensor, an ultrasonic sensor and a LiDAR sensor.

15. A non-transitory computer program product or a tangible computer-readable medium storing a computer program product, wherein the computer program product comprises computer-readable instructions that when executed will cause a fire detection system to perform a method according to claim 1.

* * * * *